(12) United States Patent
Pang

(10) Patent No.: US 11,770,469 B2
(45) Date of Patent: Sep. 26, 2023

(54) HOUSING MEMBER AND ELECTRONIC DEVICE

(71) Applicant: BEIJING XIAOMI MOBILE SOFTWARE CO., LTD., Beijing (CN)

(72) Inventor: Chenglin Pang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 86 days.

(21) Appl. No.: 17/360,778

(22) Filed: Jun. 28, 2021

(65) Prior Publication Data

US 2022/0311853 A1    Sep. 29, 2022

(30) Foreign Application Priority Data

Mar. 26, 2021    (CN) .......................... 202110328628.4

(51) Int. Cl.
*H04M 1/03*    (2006.01)
*H04M 1/02*    (2006.01)

(52) U.S. Cl.
CPC ......... *H04M 1/035* (2013.01); *H04M 1/0216* (2013.01)

(58) Field of Classification Search
None
See application file for complete search history.

(56) References Cited

U.S. PATENT DOCUMENTS

| 2020/0329303 | A1 | 10/2020 | Sim et al. | |
| 2021/0064322 | A1* | 3/2021 | Lim | G06F 1/1649 |
| 2022/0078317 | A1* | 3/2022 | Wang | H04M 1/0264 |

FOREIGN PATENT DOCUMENTS

| CN | 210041884 U | * | 2/2020 | .......... H04M 1/0264 |
| CN | 111182399 A | | 5/2020 | |
| CN | 112738301 A | * | 4/2021 | |
| CN | 114697426 A | * | 7/2022 | |
| WO | 2019179352 A1 | | 9/2019 | |
| WO | WO-2019179352 A1 | * | 9/2019 | .......... H04M 1/0266 |
| WO | WO-2021147472 A1 | * | 7/2021 | |

OTHER PUBLICATIONS

Supplementary European Search Report in the European application No. 21182305.9 dated Dec. 22, 2021, (34p).

* cited by examiner

*Primary Examiner* — Quoc D Tran
(74) *Attorney, Agent, or Firm* — Arch & Lake LLP

(57) ABSTRACT

A housing member and an electronic device are provided. The housing member is configured to accommodate a receiver audio assembly, and includes a rear shell, a middle frame and a sound transmission gap for sound transmission. The rear shell and the middle frame define an accommodating cavity for accommodating the receiver audio assembly, the accommodating cavity is provided with an opening for sound transmission, and the opening is opposite to the rear shell. The middle frame is provided with a sound transmission channel for communicating the opening of the accommodating cavity with the sound transmission gap. The electronic device includes the receiver audio assembly and the housing member. The receiver audio assembly is fixed in the accommodating cavity. The sound exiting direction of the receiver audio assembly is opposite to the rear shell and coincides with a direction of the opening of the accommodating cavity.

13 Claims, 5 Drawing Sheets

HOUSING MEMBER AND ELECTRONIC DEVICE

CROSS-REFERENCE TO RELATED APPLICATION

The present application is based upon and claims priority to Chinese Patent Application No. 202110328628.4, filed on Mar. 26, 2021, the entire content of which is incorporated herein by reference for all purposes.

TECHNICAL FIELD

The present disclosure relates to the field of terminal, and particularly relates to a housing member and an electronic device.

BACKGROUND

With the advancement of the science and technology, the application of folding-screen mobile phones with screens on both sides has become more and more widespread. In order to ensure the convenience of use, a receiver is usually disposed on one side of a mobile phone. The difficulty in technological improvement lies in ensuring the quality of sound of the receiver and preventing external impurities from entering the inside of the mobile phone and affecting the sound transmission.

SUMMARY

The present disclosure provides a housing member and an electronic device, which can improve the quality of the sound emit by a receiver audio assembly.

According to the first aspect of the present disclosure, a housing member is provided. The housing member is configured to accommodate the receiver audio assembly, and includes a rear shell, a middle frame, and a sound transmission gap for sound transmission. The rear shell and the middle frame define an accommodating cavity for accommodating the receiver audio assembly. The accommodating cavity is provided with an opening for sound transmission, and the opening is opposite to the rear shell. The middle frame is provided with a sound transmission channel for communicating the opening of the accommodating cavity with the sound transmission gap.

According to the second aspect of the present disclosure, an electronic device is provided. The electronic device includes a receiver audio assembly and the housing member as mentioned in the first aspect of the present disclosure. The receiver audio assembly is fixed in the accommodating cavity. A sound exiting direction of the receiver audio assembly is opposite to the rear shell and coincides with a direction of the opening of the accommodating cavity.

It should be understood that the above general descriptions and detailed descriptions below are only exemplary and explanatory and not intended to limit the present disclosure.

DETAILED DESCRIPTION

Figure 1:
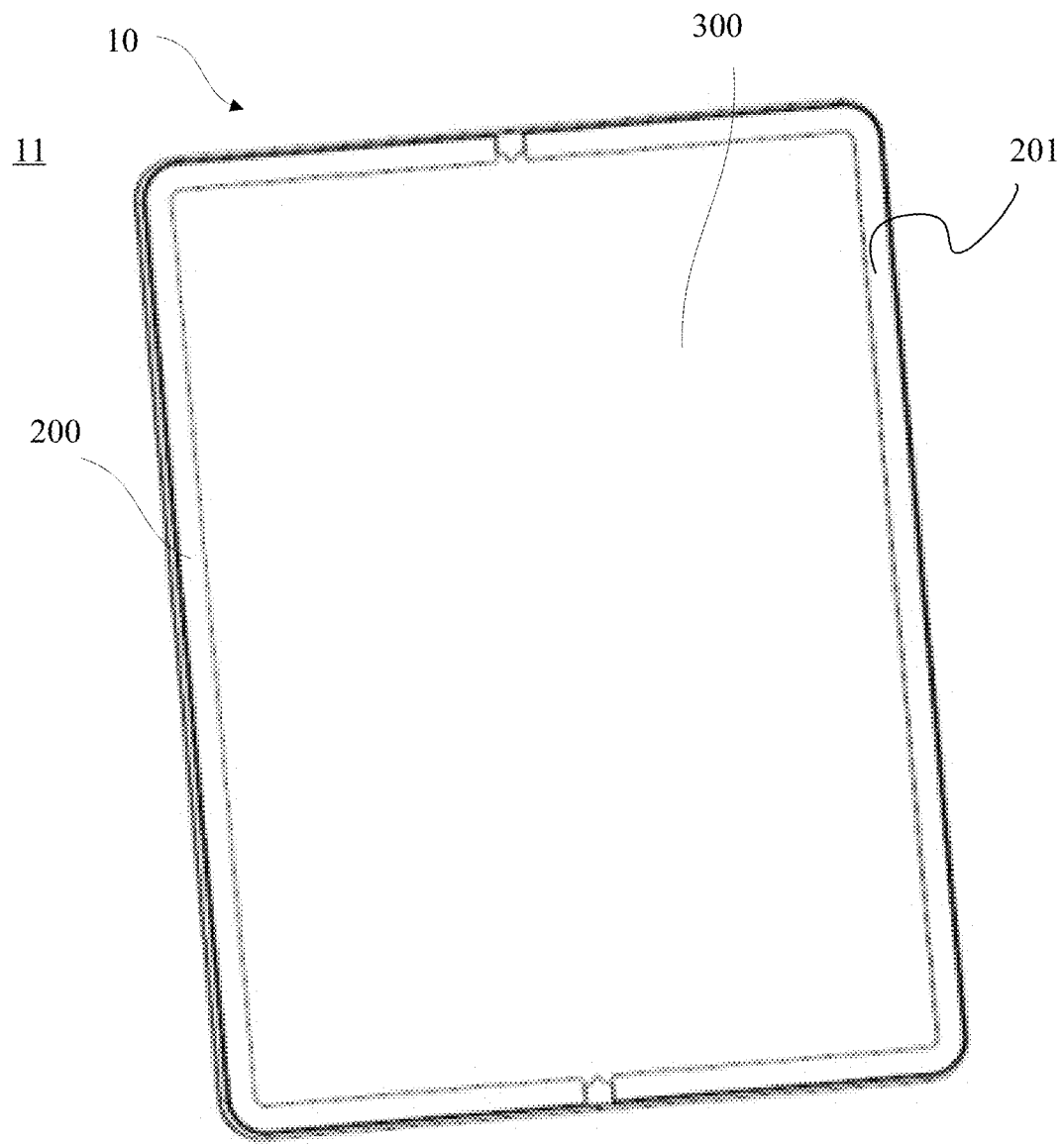
FIG. 1 is a schematic perspective view of an electronic device according to one or more examples of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses consistent with aspects related to the present disclosure as recited in the appended claims.

The terms used in the present disclosure are for the purpose of describing specific embodiments only, and are not intended to limit the present disclosure. Unless otherwise defined, the technical terms or scientific terms used in the present disclosure shall have the usual meanings understood by those with general skills in the field of the present disclosure. The "first", "second" and similar words used in the specification and claims of the present disclosure do not denote any order, quantity or importance, but are only used to distinguish different components. Similarly, similar words such as "one" or "a" do not mean a quantity limit, but mean that there is at least one. If it only refers to "one", it will be described separately. "Multiple" or "several" means two or more. Unless stated otherwise, similar words such as "front", "rear", "lower", and/or "upper" are just for convenience of explanation, and are not limited to a position or a spatial orientation. Similar words "comprise" or "include" and the like mean that elements or objects preceding "comprise" or "include" encompass listed elements or objects following "comprise" or "include" and their equivalents, and do not exclude other elements or objects. Similar words "connect" or "connected" and the like are not limited to physical or mechanical connections, and may include electrical connections, whether direct or indirect. The singular forms "a", "the" and "this" used in the specification and appended claims of the present disclosure may also include plural forms unless the contexts clearly indicate other meanings. It is also to be understood that the term "and/or" used in the disclosure refers to and includes one or any or all possible combinations of multiple associated items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The examples of the present disclosure will be described in detail below with reference to the drawings. In the case of no conflict, the features in the following examples may be combined with each other.

LIST OF REFERENCE NUMERALS

Figure 2:
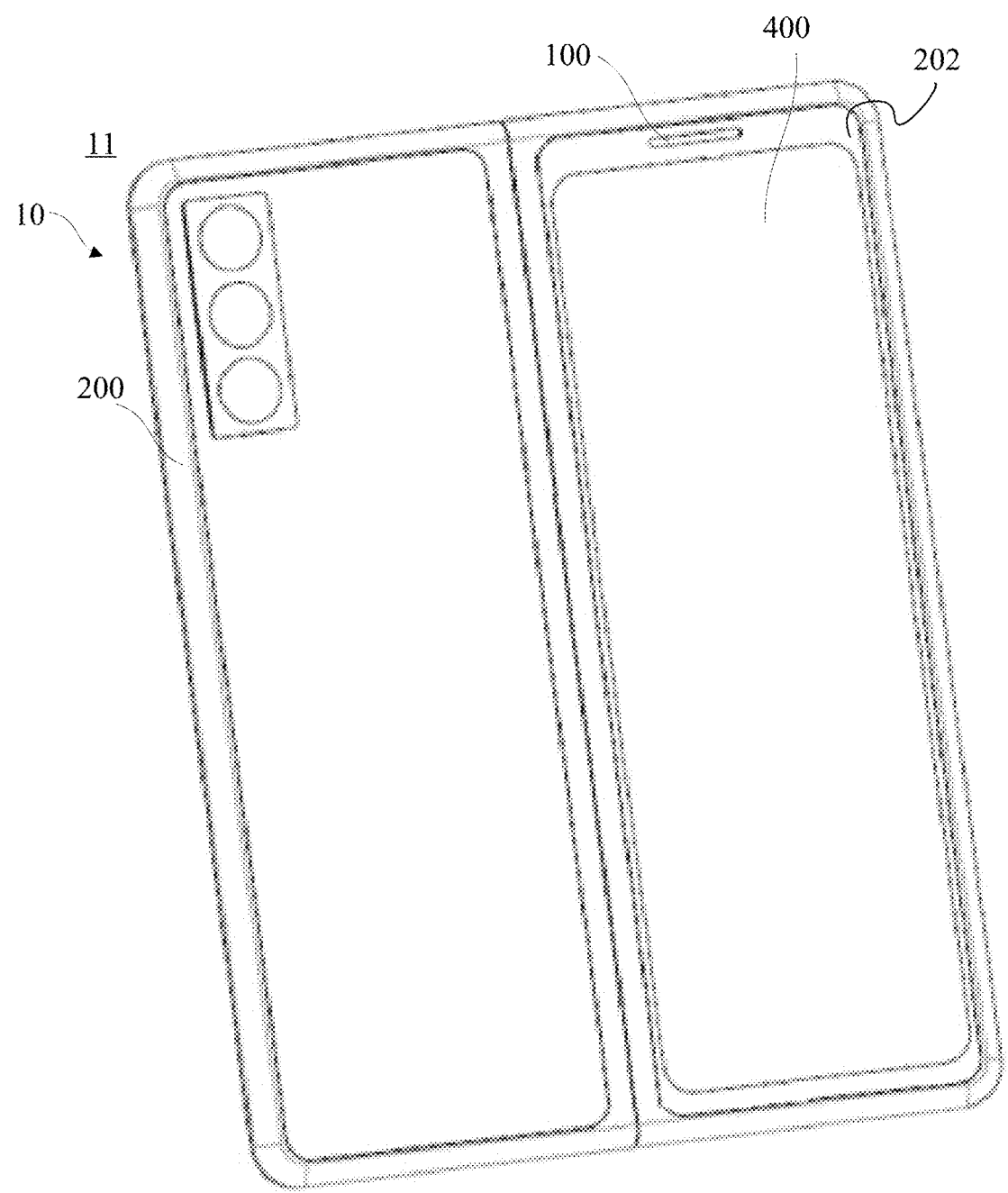
FIG. 2 is another schematic perspective view of an electronic device according to one or more examples of the present disclosure.
Figure 3:
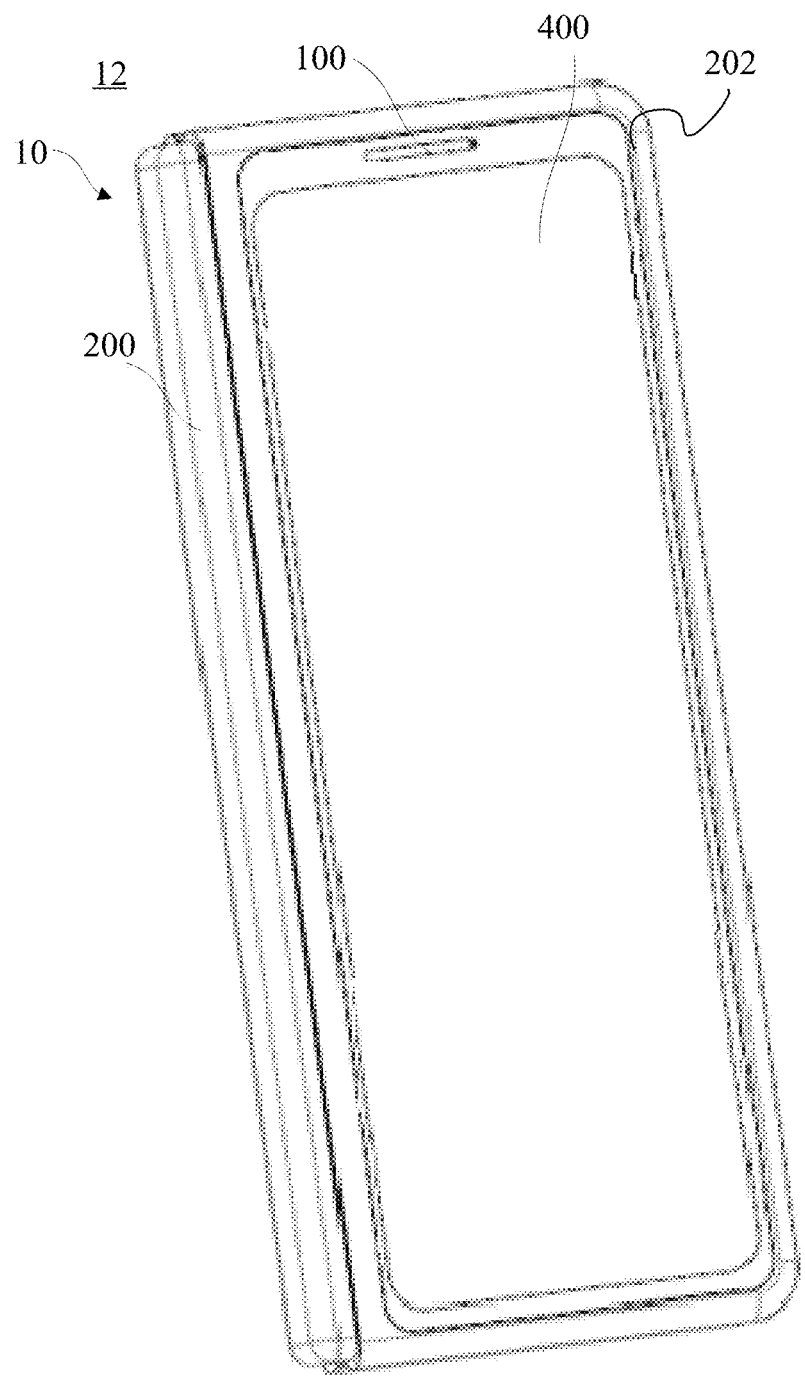
FIG. 3 is another schematic perspective view of an electronic device according to one or more examples of the present disclosure.
Figure 4:
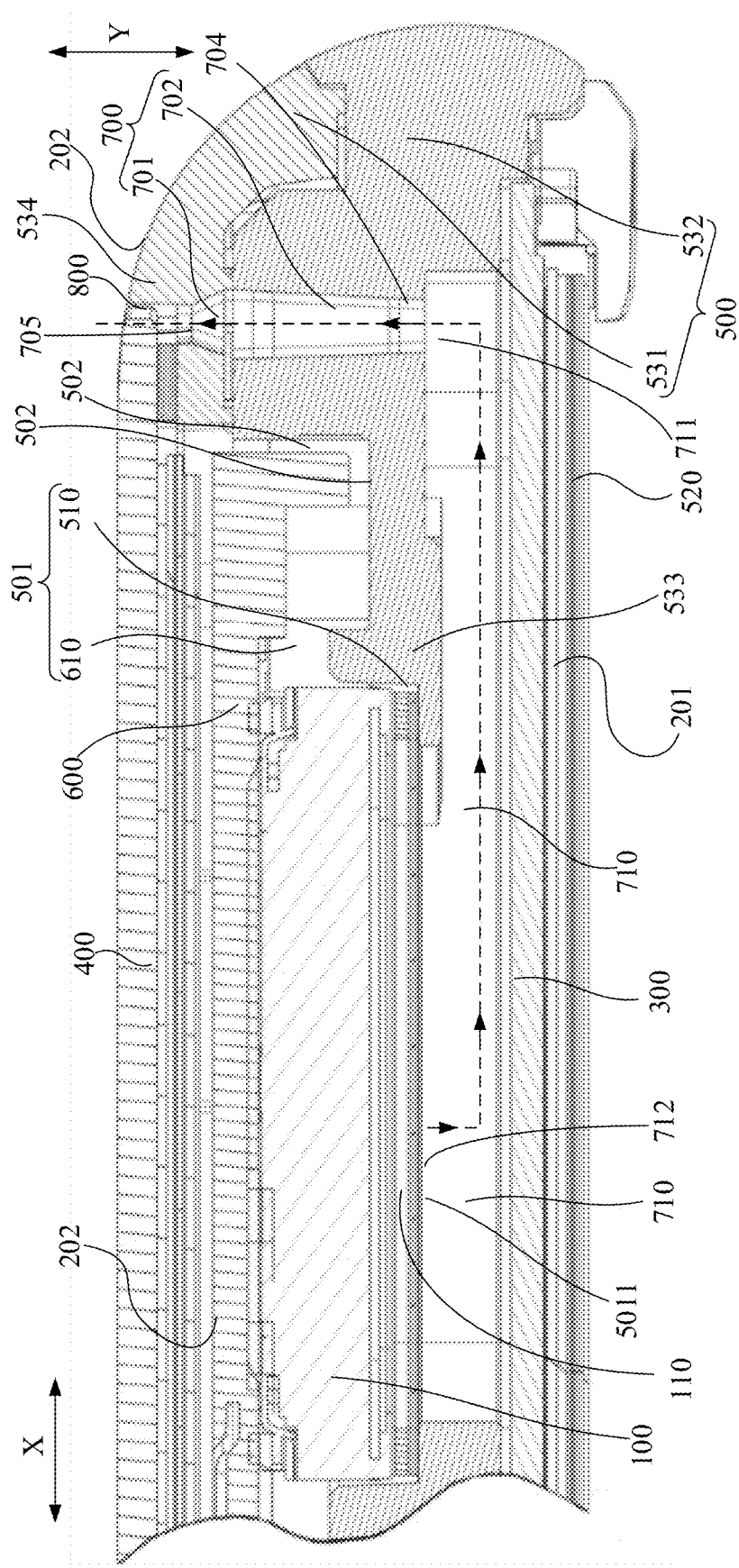
FIG. 4 is a schematic view showing a part of the cross-section of an electronic device according to one or more examples of the present disclosure.

Electronic device 10
Unfolded state 11
Folded state 12
Receiver audio assembly 100
Foam assembly 110
Housing member 200
First display end surface 201
Second display end surface 202
First display panel 300
Second display panel 400
Display screen 410
Glass cover plate 420
Middle frame 500
Accommodating cavity 501
Opening 5011
First gap 502
First accommodating space 510
Sound cavity cover plate 520
First frame portion 531
Second frame portion 532
First supporting part 533
Second supporting part 534
Rear shell 600
Second accommodating space 610
Sound transmission channel 700
First channel 701
Second channel 702
First sound cavity 710
Sound transmission gap 800
First direction X
Second direction Y As shown in FIG. 1 to FIG. 3, and referring to FIG. 4 when necessary, the present disclosure relates to an electronic device 10, and the electronic device 10 includes a receiver audio assembly 100 for emitting sound. In this example, the electronic device 10 is a mobile phone. The mobile phone usually has two sets of receiver audio assemblies 100, in which the receiver audio assembly 100 at the top of the electronic device 10 serves as a handset, and the receiver audio assembly 100 at the bottom of the electronic device 10 serves as a loudspeaker. Of course, in other examples, the mobile phone may also only have the receiver audio assembly 100 at the top. Alternatively, the electronic device 10 may also be other devices with receiver audio assemblies 100, such as a computer, a tablet computer, an e-book, a watch, and earphones. The present disclosure aims to improve the structure of the receiver audio assembly 100 at the top of the electronic device 10.

The electronic device 10 further includes a housing member 200. The housing member 200 is configured to accommodate the receiver audio assembly 100, and support and protect other electronic elements (such as a control panel, a battery and a display panel) in the electronic device 10.

As shown in FIG. 1 to FIG. 3, in this example, the electronic device 10 is a mobile phone with two screens. Specifically, the electronic device 10 further includes a first display panel 300 and a second display panel 400. The housing member 200 further includes a first display end surface 201 and a second display end surface 202 which are disposed oppositely along a thickness direction. The first display panel 300 is fixed to the first display end surface 201, and the second display panel 400 is fixed to the second display end surface 202.

The first display panel 300 is a flexible display panel which is deformable. The housing member 200 of the electronic device 10 is also foldable, or at least a part of the housing member 200 may be turned over. The electronic device 10 is deformed as the folding of the housing member 200. Specifically, the electronic device 10 can be switched between an unfolded state 11 and a folded state 12.

As shown in FIG. 1 and FIG. 2, when the electronic device 10 is in the unfolded state 11, the planes in which the first display panel 300 and the second display panel 400 are located are both flat surfaces. At this time, both the first display panel 300 and the second display panel 400 can be configured to display image information, or one of the first display panel 300 and the second display panel 400 is configured to display image information. As shown in FIG. 3, when the electronic device 10 is in the folded state 12, the first display panel is folded (the first display panel is shielded and is thus not visible in FIG. 3) and cannot be used for displaying image information. At this time, only the second display panel 400 is exposed and suitable for displaying image information. Of course, in other examples, when the electronic device 10 is in the folded state 12, the first display panel 300 also can display image information.

In one example, the second display panel 400 may include a display screen 410 and a glass cover plate 420.

In this example, in order to facilitate storage and portability, the electronic device 10 usually can be switched to the folded state 12 for storage and carrying. In order to improve the convenience of use, the sound transmission gap 800 in communication with the receiver audio assembly 100 (handset) is usually formed on the second display end surface 202 of the housing member 200, and the sound emitted by the receiver audio assembly 100 (handset) can be transmitted to the outside through the sound transmission gap 800 and then captured by a user (as shown in FIG. 4).

As shown in FIG. 4, the housing member 200 includes a middle frame 500, a rear shell 600, a sound transmission channel 700 and a sound transmission gap 800. The middle frame 500 and the rear shell 600 define an accommodating cavity 501 for accommodating the receiver audio assembly 100. The receiver audio assembly 100 is fixed in the accommodating cavity 501 to realize the position limitation on the receiver audio assembly 100. The sound transmission gap 800 is formed between the second display panel 400 and the middle frame 500, and the sound emitted from the receiver audio assembly 100 can be transmitted to the outside through the sound transmission gap 800. The sound transmission channel 700 is disposed in the middle frame 500 and passes through the middle frame. The first end 704 of the sound transmission channel 700 is in communication with the accommodating cavity 501, and the second end 705 of the sound transmission channel 700 is in communication with the sound transmission gap 800 which is in communication with the outside, so that the sound emitted by vibration of the receiver audio assembly 100 can be transmitted to the outside through the sound transmission channel 700 and captured by the user. Due to the technique process limitation, the tight fit of the middle frame 500 and the rear shell 600 cannot be ensured. Therefore, there is a gap at the joint of the middle frame 500 and the rear shell 600.

Figure 5:
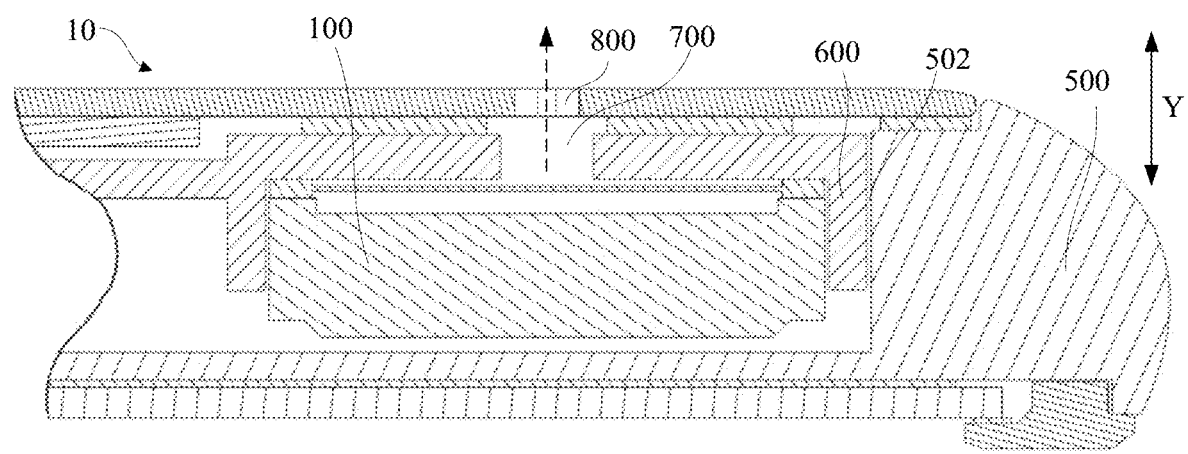
FIG. 5 is a schematic view showing a part of the cross-section of an electronic device according to one or more examples of the present disclosure.

In an example, as shown in FIG. 5, the sound transmission channel 700 extends along a thickness direction Y of the housing member 200, and the sound transmission channel 700 only has a component in the thickness direction. In the above arrangement, the sound emitted by the receiver audio assembly 100 can be directly transmitted to the outside through the sound transmission channel 700. The sound transmission direction is indicated by the arrow in the figure. Furthermore, external particles, liquids and other impurities will directly enter the accommodating cavity 501 through the sound transmission channel 700. Then the sound transmission direction is opposite to the direction indicated by the arrow in the figure. In this example, external particles, liquids and other impurities will directly enter the accommodating cavity 501 through the sound transmission channel 700, which will affect the normal production of the sound of the receiver audio assembly 100, affect the sound quality, and also seriously affect the service life of the receiver audio assembly 100.

Figure 6:
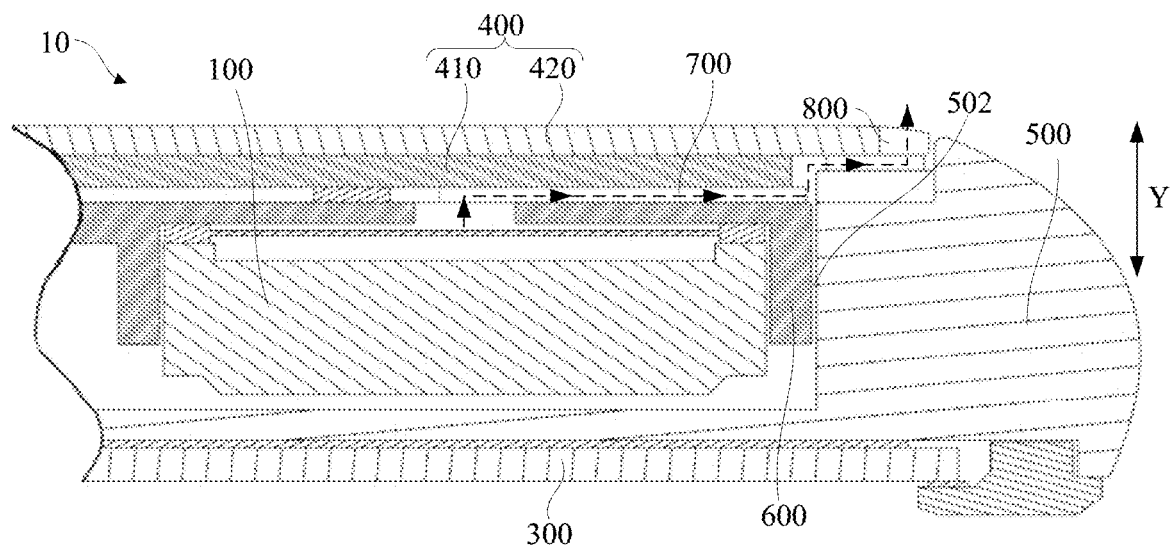
FIG. 6 is a schematic view showing a part of the cross-section of another electronic device according to one or more examples of the present disclosure.

In another example, as shown in FIG. 6, the sound transmission channel 700 extends sinuously, that is, there are components in the thickness direction Y and components in the horizontal direction as shown in the figure, so as to prevent external particles, liquids and other impurities from directly entering the accommodating cavity 501 through the sound transmission channel 700. The sound emitted by the receiver audio assembly 100 can be directly transmitted to the outside through the sound transmission channel 700. The sound transmission direction is indicated by the arrow in the figure. Furthermore, external particles, liquids and other impurities will also directly enter the sound transmission channel 700 through the sound transmission gap 800. However, as mentioned above, due to the technical process limitation, the tight fit of the middle frame 500 and the rear shell 600 cannot be ensured. Therefore, a first gap 502 will be formed at the joint of the middle frame 500 and the rear shell 600. In this example, the sound transmission channel 700 is directly communicated with the first gap 502, which may cause the sound from the receiver audio assembly 100 to leak at the first gap 502 during the sound is transmitted in the sound transmission channel 700, and thus the sound quality of the receiver affected. Furthermore, external particles, liquids and other impurities will also enter the first gap 502 through the sound transmission channel 700, that is, the external particles, liquids and other impurities will enter the internal gap of the electronic device 10, and cannot be effectively cleaned, which may cause the functional damage to the electronic device 10 and affect the stability and service life of the electronic device 10.

As shown in FIG. 4, in this example, the accommodating cavity 501 is provided with an opening 5011 for sound transmission. The opening 5011 is opposite to the rear shell and faces towards the first display end surface 201. In other words, when the receiver audio assembly 100 is fixed in the accommodating cavity 501, the sound exiting direction of the audio assembly is opposite to the rear shell 600 and coincides with the direction of the opening 5011 of the accommodating cavity 501.

In the above arrangement, by changing the orientation of the opening 5011 of the accommodating cavity 501, that is, changing the sound exiting direction of the receiver audio assembly 100, the sound transmission channel 700 may be formed inside the middle frame 500, thereby preventing external impurities from entering the gap between the middle frame 500 and the rear shell 600 through the sound transmission channel 700 so as to improve the stability of the electronic device 10 and prolong the service life of the electronic device 10, and also preventing the sound emitted by the receiver audio assembly 100 from leaking at the gap between the middle frame 500 and the rear shell 600 so as to ensure the quality of the sound of the receiver audio assembly 100.

In this example, the sound transmission channel 700 has components in the first direction X and a component in the second direction Y. In other words, the sound transmission channel 700 extends along a sinuous path. The first direction X is perpendicular to the second direction Y. In this example, the second direction Y is the thickness direction of the electronic device 10, and the first direction X is the horizontal direction as shown in the figure.

In the above arrangement, the sound transmission channel 700 has components in the first direction X and the component in the second direction Y, thereby preventing external particles, liquids and other impurities from directly entering the accommodating cavity 501 through the sound transmission channel 700 and from affecting the normal production of sound of the receiver audio assembly 100, so as to ensure the sound quality of the receiver audio assembly 100.

It should be noted that in this example, the sound transmission channel 700 is in a "Z" shape. Of course, in other examples, the sound transmission channel 700 may also have a structure extending obliquely.

Further, the receiver audio assembly 100 further includes a foam assembly 110, which is disposed on one side of the receiver audio assembly 100 adjacent to the sound transmission channel 700, so as to prevent external impurities and particles from entering the inside of the receiver audio assembly through the sound transmission channel 700, thereby ensuring the normal production of the sound of the receiver audio assembly 100.

Further, the middle frame 500 is provided with a first accommodating space 510 for fixing the receiver audio assembly 100, and the rear shell 600 is provided with a second accommodating space 610 for fixing the receiver audio assembly 100. In this example, the first accommodating space 510 and the second accommodating space 610 together form the accommodating cavity 501. In another example, the first accommodating space 510 and/or the second accommodating space 610 may serve as at least a part of the accommodating cavity 501.

The receiver audio assembly 100 includes a vibrating membrane and a magnetic component. The magnetic component generates vibration under the action of electric power, thereby driving the air and the vibrating membrane to vibrate to produce sound. The receiver audio assembly 100 is fixed in the accommodating cavity 501, and the vibrating membrane faces towards the opening 5011 of the accommodating cavity 501, so that the sound exiting direction of the receiver audio assembly 100 is opposite to the rear shell 600 and coincides with the direction of the opening 5011 of the accommodating cavity 501.

In this example, the sound transmission gap 800 is located on the second display end surface 202 to ensure that the first display end surface 201 may be only used for to fix the first display panel 300, thereby increasing the area of the first display panel 300 to the maximum extent and increasing the screen-to-body ratio of the first display end surface 201. Furthermore, as the sound transmission gap 800 is formed at the edge of the second display end surface 202, the region for fixing the second display end surface 202 is larger so as to provide a feasibility for increasing the screen-to-body ratio. The opening 5011 of the accommodating cavity 501 faces towards the first display end surface 201. Furthermore, the vibrating membrane of the receiver audio assembly 100 faces towards the opening 5011 of the accommodating cavity 501. Through the above arrangement, the sound transmission gap 800 may be formed at the second display end surface 202 for fixing the second display panel 400, and the normal production of the sound of the receiver audio assembly 100 can also be ensured.

Further, as shown in FIG. 4, the housing member 200 further includes a sound cavity cover plate 520 which is spaced apart from at least a part of the middle frame 500 to form a first sound cavity 710. The first end 711 of the first sound cavity 710 is in communication with the sound transmission channel 700, and the second end 712 of the first sound cavity 710 is in communication with the opening 5011 of the accommodating cavity 501. It should be noted that the first sound cavity 710, the sound transmission channel 700 and the sound transmission gap 800 together form a front sound cavity of the receiver audio assembly 100. The first sound cavity 710 is a part of the front sound cavity and plays a certain role in strengthening the sound.

In this example, the sound cavity cover plate 520 and the middle frame 500 are two separate components. The sound cavity cover plate 520 and the middle frame 500 are fixedly connected to one another after the receiver audio assembly 100 is fixed in the accommodating cavity 501, and then, the first display panel 300 is fixed to the sound cavity cover plate 520 and to one end of the middle frame 500 away from the receiver audio assembly 100. In other words, the sound cavity cover plate 520 and at least a part of the structure of the middle frame 500 form the first display end surface 201.

Through the above arrangement, the mounting of each of the parts in the electronic device 10 can be realized conveniently. Furthermore, the sound transmission channel 700 having components in the first direction X and the component in second direction Y, namely the first sound cavity 710 and a conducting part 720, is formed by splicing the first and second sound cavities, so that the manufacturing process can be simplified. Of course, in other examples, the sound cavity cover plate 520 may also be formed in a single piece with the middle frame 500.

Further, the middle frame 500 includes a first frame portion 531 and a second frame portion 532 connected to one another. At least a part of the first frame portion 531 serves as the second display end surface 202. The sound transmission channel 700 passes through the first frame portion 531 and the second frame portion 532. The second frame portion 532 includes a first supporting part 533 extending along the first direction X, and the first supporting part 533 is configured to define the accommodating cavity 501 and support the receiver audio assembly 100. The first supporting part 533 and the sound cavity cover plate 520 are disposed opposite to each other, and together define the first sound cavity 710.

In this example, the first frame portion 531 and the second frame portion 532 are separate components. In the scenario where the first frame portion and the second frame portion need to be combined together, the first frame portion 531 and the second frame portion 532 may be fixedly connected to each other by bonding. Of course, in another examples, the first frame portion 531 and the second frame portion 532 may also be fixedly connected in other manners. In one example, the first frame portion 531 and the second frame portion 532 may be inseparable, that is, the first frame portion 521 and the second frame portion 532 are formed in a single piece.

Further, the material of the first frame portion 531 is an insulating material, and the material of the second frame portion 532 is a metal material. In the above arrangement, the middle frame 500 may be made of two materials, and one of the materials is an insulating material, thereby avoiding the formation of an electric shielding space and increasing the clearance region for an antenna.

Specifically, the material of the first frame portion 531 may also be plastic. At least a part of the first frame portion 531 serves as the second display end surface 202, and the plastic first frame portion 531 for defining the sound transmission gap 800 is favorable for realizing the narrow design of the sound transmission gap 800, thereby being conducive to improving the aesthetics of the appearance so as to improve the product competitiveness.

Further, the sound transmission channel 700 includes a first channel 701 and a second channel 702. The first channel 701 passes through the first frame portion 531, and the second channel 702 passes through the second frame portion 532. The cross-section area of the first channel 701 is less than or equal to the cross-section area of the second channel 702. Through the above arrangement, the cross-section area of the sound transmission channel 700 is reduced at a position adjacent to the sound transmission gap 800, thereby playing a certain role in strengthening the sound.

Further, the middle frame 500 includes a first supporting part 533 extending along the first direction X and a second supporting part 534 extending along the second direction Y. The first supporting part 533 supports the receiver audio assembly 100, and at least a part of the first supporting part 533 defines the accommodating cavity 501. Furthermore, the first supporting part 533 and the sound cavity cover plate 520 are disposed opposite to each other and together define the first sound cavity 710.

As shown in FIG. 4, in this example, a first gap 502 is formed at the joint between the middle frame 500 and the rear shell 600. The middle frame 500 can obstruct the communication between the first gap 502 and the sound transmission channel 700. Of course, in other examples, the communication between the first gap 502 and the sound transmission channel 700 may also be obstructed by the rear shell 600.

There is a larger first gap 502 between the middle frame 500 and the rear shell 600. The first gap 502 and the sound transmission channel 700 are isolated, to prevent the external particles, liquids and other impurities that enters through the sound transmission channel 700 from directly entering the first gap 502, so as to improve the stability of the electronic device 10 and prolong the service life of the electronic device 10, and also prevent the sound emitted by the receiver audio assembly 100 from leaking at the first gap 502 so as to ensure the quality of the sound of the receiver audio assembly 100.

The foregoing descriptions are merely preferred examples of the present disclosure, and are not intended to limit the present disclosure in any form. Although the present disclosure has been disclosed above through the preferred examples, the examples are not intended to limit the present disclosure. Any person skilled in the art can make some variations or modifications, namely, equivalent changes, according to the foregoing disclosed technical content to obtain equivalent examples without departing from the scope of the technical solutions of the present disclosure. Any simple amendment, equivalent change, or modification made to the foregoing examples according to the technical essence of the present disclosure without departing from the content of the technical solutions of the present disclosure shall fall within the scope of the technical solutions of the present disclosure.

What is claimed is:

1. A housing member, comprising: a rear shell, a middle frame, and a sound transmission gap for sound transmission, wherein the housing member is configured to accommodate a receiver audio assembly;
   wherein the rear shell and the middle frame define an accommodating cavity for accommodating the receiver audio assembly, the accommodating cavity is provided with an opening for sound transmission, and the opening is opposite to the rear shell; and
   wherein the middle frame is provided with a sound transmission channel which is disposed inside the middle frame and passes through the middle frame, and the accommodating cavity communicates with the sound transmission channel and the sound transmission gap via the opening,
   wherein the housing member comprises a sound cavity cover plate, the sound cavity cover plate and at least a part of the middle frame are spaced apart from one another and form a first sound cavity, a first end of the first sound cavity is in communication with the sound transmission channel, and a second end of the first sound cavity is in communication with the opening,
   wherein the middle frame comprises a first frame portion and a second frame portion connected to one another, and the sound transmission channel passes through the first frame portion and the second frame portion; and
   wherein the second frame portion comprises a first supporting part extending along the first direction, the first supporting part is configured to define the accommodating cavity and support the receiver audio assembly, the first supporting part and the sound cavity cover plate are disposed opposite to one another and define the first sound cavity.

2. The housing member of claim 1, further comprising: a first display end surface and a second display end surface, wherein the first display end surface and the second display end surface are disposed opposite to one another, the sound transmission gap is disposed on the second display end surface, and the opening of the accommodating cavity faces towards the first display end surface.

3. The housing member of claim 2, wherein the middle frame comprises a first frame portion and a second frame portion connected to one another, and the sound transmission channel passes through the first frame portion and the second frame portion; and
   wherein at least a part of the first frame portion serves as the second display end surface, and the first frame portion is configured to define the sound transmission gap.

4. The housing member of claim 1, wherein a material of the first frame portion is an insulating material.

5. The housing member of claim 1, wherein the sound transmission channel comprises a first channel and a second channel, the first channel passes through the first frame portion, and the second channel passes through the second frame portion; and
   wherein a cross-sectional area of the first channel is less than or equal to a cross-sectional area of the second channel.

6. The housing member of claim 1, wherein a first gap is formed at a joint between the middle frame and the rear shell, and
   wherein the middle frame or the rear shell obstructs the communication between the first gap and the sound transmission channel.

7. An electronic device, comprising a receiver audio assembly and a housing member,
   wherein the housing member comprises a rear shell, a middle frame, and a sound transmission gap for sound transmission;
   wherein the rear shell and the middle frame define an accommodating cavity for accommodating the receiver audio assembly, the accommodating cavity is provided with an opening for sound transmission, and the opening is opposite to the rear shell;
   wherein the middle frame is provided with a sound transmission channel which is disposed inside the middle frame and passes through the middle frame, and the accommodating cavity communicates with the sound transmission channel and the sound transmission gap via the opening;
   wherein the housing member comprises a sound cavity cover plate, the sound cavity cover plate and at least a part of the middle frame are spaced apart from one another and form a first sound cavity, a first end of the first sound cavity is in communication with the sound transmission channel, and a second end of the first sound cavity is in communication with the opening,
   wherein the middle frame comprises a first frame portion and a second frame portion connected to one another, and the sound transmission channel passes through the first frame portion and the second frame portion;
   wherein the second frame portion comprises a first supporting part extending along the first direction, the first supporting part is configured to define the accommodating cavity and support the receiver audio assembly, the first supporting part and the sound cavity cover plate are disposed opposite to one another and define the first sound cavity;
   wherein the receiver audio assembly is fixed in the accommodating cavity; and
   wherein a sound exiting direction of the receiver audio assembly is opposite to the rear shell and coincides with a direction of the opening of the accommodating cavity.

8. The electronic device of claim 7, wherein the housing member comprises a first display end surface and a second display end surface disposed opposite to one another;
   wherein the electronic device further comprises a first display panel and a second display panel, the first display panel is fixed to the first display end surface, and the second display panel is fixed to the second display end surface; and
   wherein the sound transmission gap is formed between the second display panel and the middle frame.

9. The electronic device of claim 7, wherein the housing member comprises a first display end surface and a second display end surface which are disposed opposite to one another, the sound transmission gap is disposed on the second display end surface, and the opening of the accommodating cavity faces towards the first display end surface.

10. The electronic device of claim 9, wherein the middle frame comprises a first frame portion and a second frame portion connected to one another, and the sound transmission channel passes through the first frame portion and the second frame portion; and
    wherein at least a part of the first frame portion serves as the second display end surface, and the first frame portion is configured to define the sound transmission gap.

11. The electronic device of claim 7, wherein a material of the first frame portion is an insulating material.

12. The electronic device of claim 7, wherein the sound transmission channel comprises a first channel and a second channel, the first channel passes through the first frame portion, and the second channel passes through the second frame portion; and wherein a cross-sectional area of the first channel is less than or equal to a cross-sectional area of the second channel.

13. The electronic device of claim 7, wherein a first gap is formed at a joint between the middle frame and the rear shell, and wherein the middle frame or the rear shell obstructs the communication between the first gap and the sound transmission channel.

\* \* \* \* \*